United States Patent [19]

Carter

[11] Patent Number: 5,452,266
[45] Date of Patent: Sep. 19, 1995

[54] SUBMERSIBLE SENSOR SYSTEM

[75] Inventor: G. Clifford Carter, Waterford, Conn.

[73] Assignee: The United States of America as represented by the Secretary of the Navy, Washington, D.C.

[21] Appl. No.: 308,336

[22] Filed: Sep. 19, 1994

[51] Int. Cl.⁶ .............................................. H04R 1/00
[52] U.S. Cl. ...................................... 367/153; 367/173
[58] Field of Search .................... 367/165, 173, 4, 153, 367/106, 130

[56] References Cited

U.S. PATENT DOCUMENTS 4,272,835 6/1981 Flood et al. .......................... 367/165

Primary Examiner—Daniel T. Pihulic
Attorney, Agent, or Firm—Michael J. McGowan; James M. Kasischke; Prithvi C. Lall

[57] ABSTRACT

A vessel, such as a submarine, has onboard sensor processing, display, and computer control capability for an array of sensors deployed from the vessel. The array includes a plurality of cables containing numerous sensors on each cable. The cables are suspended vertically from a housing on reels that provide a convenient means for deployment and recovery of the array. A submersible means at the lower end of the cables includes active transducers, propulsion devices and control surfaces for orienting and driving the structure so as to maintain a speed and direction for this structure corresponding to that of the vessel.

11 Claims, 3 Drawing Sheets

SUBMERSIBLE SENSOR SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates to the exploration of underwater environments by use of submersed sensors arrayed in a manner such that passive sensors receive signals generated by active electromagnetic or sonar transducers. The signals are reflected back to the sensors in such a way that 360° coverage of the reflective signals can be processed aboard a vessel deploying the array in order to provide continuous monitoring and analysis of these returned or received signals.

2. Description of the Prior Art

Sea going vessels and aircraft have employed arrays of sensors that are deployed in the water and towed at moderate speeds to sense environmental conditions including, for example, the progress of underwater salvage operations, oil explorations systems, and in fish finding and bottom contour plotting systems. Generally, these towed arrays comprise horizontal streamers that are often equipped only to sense acoustic energy and often cannot be deployed at relatively low vessel speeds due to the likelihood of the sensing array becoming fouled in the towing ships propeller or screw. A further disadvantage of such prior art towed arrays is that they do not lend themselves to effective operation in relatively shallow water.

Hueter, U.S. Pat. No. 3,141,148, shows a vertically oriented array of hydrophones arranged on vertically spaced "decks" suspended on a central support structure. Carter, U.S. Pat. No. 4,486,869, shows a vertically oriented array of hydrophones arranged on a support structure that includes rigid circumaxially spaced rods rather than cables that can be reeled up to allow faster deployment of the system. Uchihashi et al., U.S. Pat. No. 4,866,682, like Carter '869, show a rigid structure rather than a readily deployable array of sensors such as disclosed herein.

SUMMARY OF THE INVENTION

The general purpose of the present invention is to provide a generally vertical array of sensors that is well adapted for deployment from and use by a vessel operating in relatively shallow water.

Another object is to provide a sensing system that affords 360° coverage relative to a vertical axis of generally cylindrical configuration of the array even when the array is towed by the vessel at slow speeds.

The sensor array is deployed from a housing that is in turn embedded in or supported from the vessel and includes an umbilical cable connected to the onboard sensor processing display and computer control equipment. The array of sensors is arranged in the shape of a cylindrical surface such that the axis of this cylinder is oriented generally vertically. Circumaxially spaced lines or cables are suspended from the housing, and the sensors are deployed on or as an integral part of these cables. Means is provided for deploying and for reeling these cables back into the housing to store the entire assembly when not in use. Submersible means is also provided adjacent the lower ends of these cables for maintaining the sensor array in this generally cylindrical, vertically oriented configuration. This means includes transducers that are oriented so as to direct radiant energy radially outwardly of the cylindrical array. Such transducers are located at the bottom of the array so that reflective energy will be picked up by the sensors. The sensors are adapted to provide input signals to the equipment onboard the vessel. A further feature is provision for propulsive means to drive the submersible means at the lower end of the array, and, hence the transducers. The radiated signals are generated in a radial direction corresponding generally to the direction of motion of the vessel.

BRIEF DESCRIPTION OF THE DRAWINGS

A more complete understanding of the invention and many of the attended advantages thereto will be readily appreciated as the same becomes better understood by reference to the following detailed description when considered in conjunction with the accompanying drawings wherein.

DESCRIPTION OF THE PREFERRED EMBODIMENT

Figure 1:
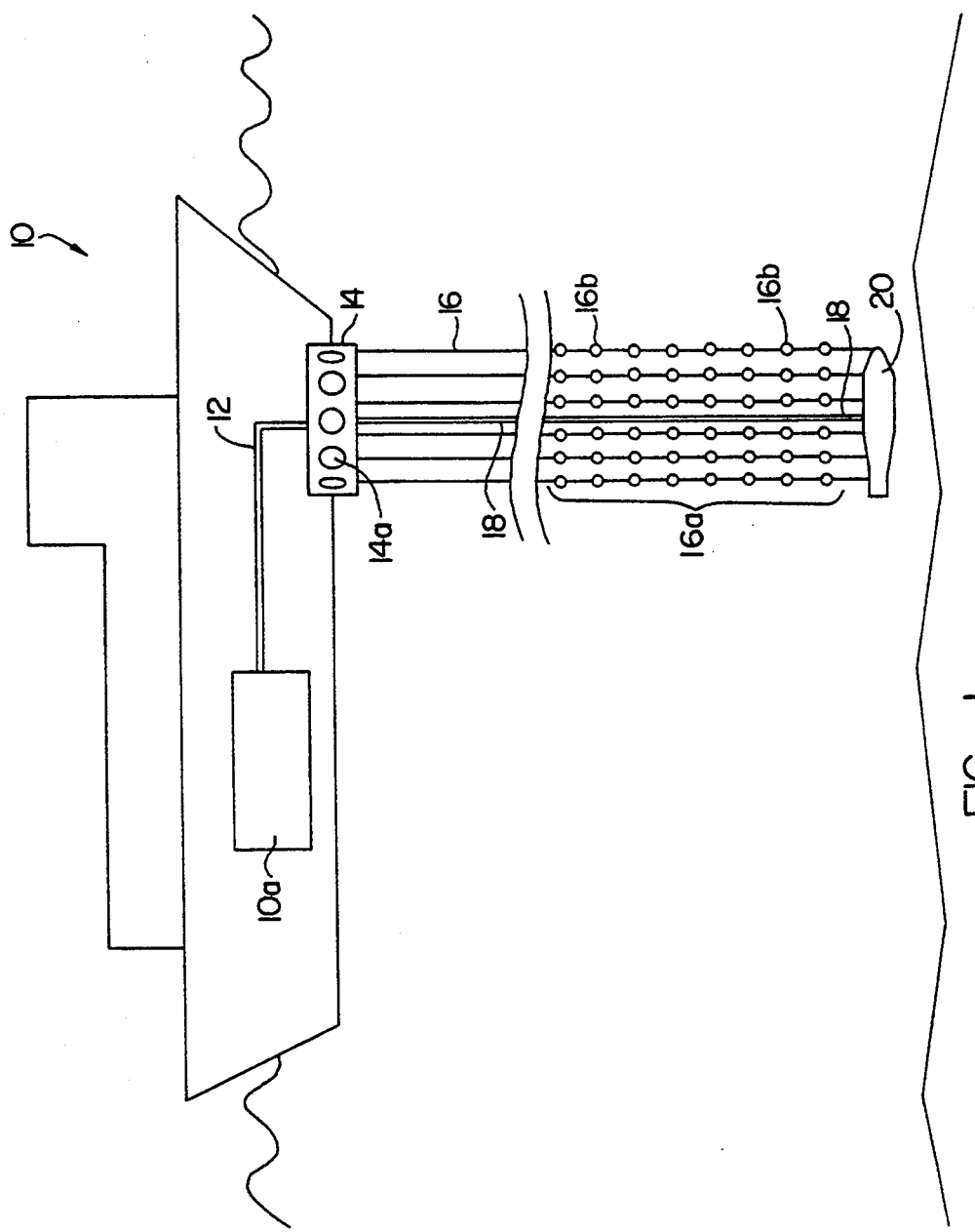
FIG. 1 shows the submersible sensing system with portions broken away, as deployed from a vessel.

Referring now to FIG. 1, there is shown a vessel 10 equipped with suitable sensor processing displaying computer control equipment 10a onboard the vessel 10 and connected by an umbilical cord 12 to a generally cylindrical housing 14 that is supported from the vessel 10 and adapted to being stored on board. The umbilical cable 12 connects to a control cable 18 provided generally centrally of the housing and extending downwardly to submersible means indicated generally at 20 that is supported at the lower end of the array.

The housing 14 defines an internal cavity or chamber in which a plurality of reel devices 14a are mounted to permit deploying a plurality of circumaxially spaced cables 16. The lower portions of cables 16 form a sensor array 16a having a plurality of sensors 16b positioned thereon. Preferably, the number of sensors comprises at least 999 sensor elements provided on 9 cables. These sensors 16b provide output signals proportional to the degree of radiation they receive. The source of such radiation can be from an object of interest directly or as a result of reflection from signals emitted by the lower submersible means 20 of the device. Submersible means 20 is more particularly shown and described with reference to FIGS. 2 and 3.

Figure 2:
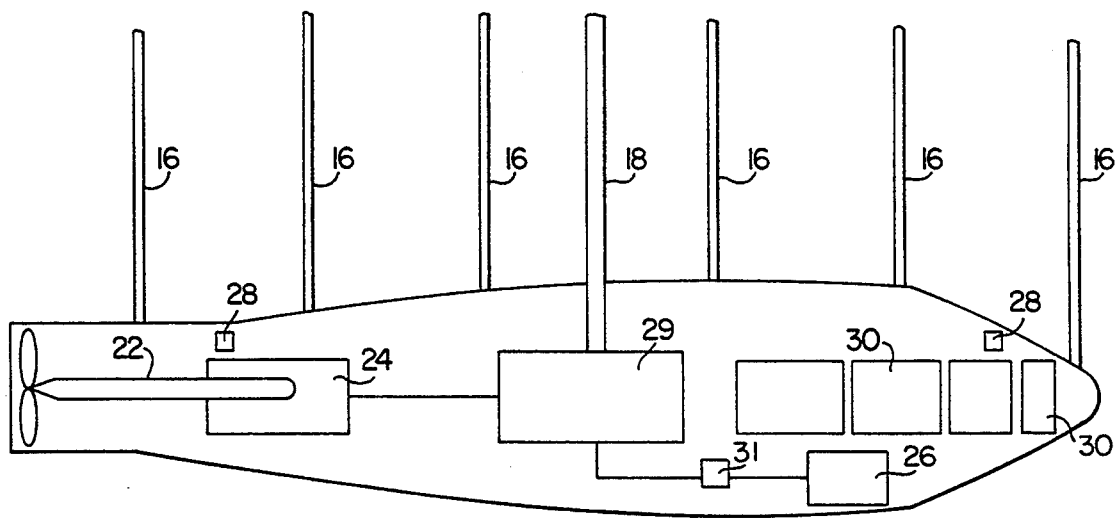
FIG. 2 is a vertical elevation of the lower portion of the submersible array.
Figure 3:
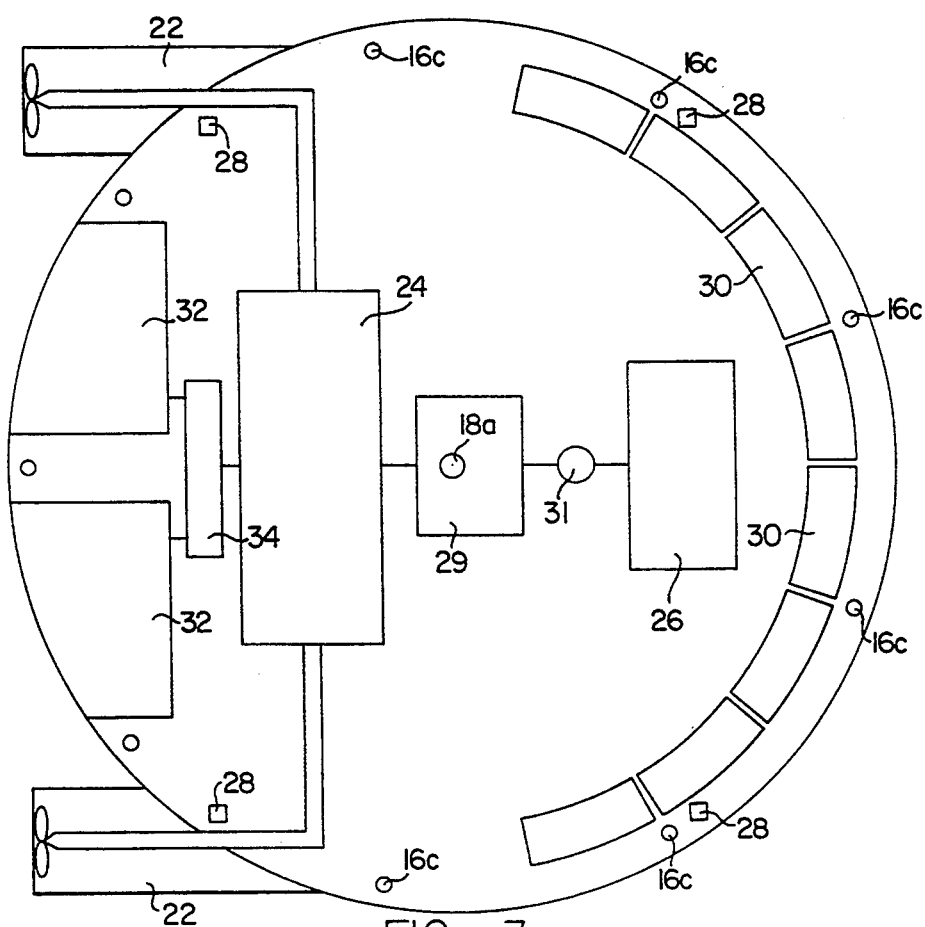
FIG. 3 is a top plan view of the apparatus depicted in FIG. 2.

As best shown in FIG. 2, active sonar transducers 30 are provided in the submersible means 20. The submersible means 20 of FIG. 2 preferably includes propulsive means in the form of twin thrusters 22 adapted to be driven and operated remotely from onboard the vessel 10 through the umbilical cord 12 and cable 18. These thrusters 22 can include one or more electric motors 24 as shown in FIG. 3. For control purposes, at least one stabilizer 32 joined to an actuator 34 is also controlled electrically from onboard the vessel 10 in order to control the attitude of the submersible means 20 of FIGS. 2 and 3. Thus, the lower end of the generally cylindrical sensor array 16a depicted in FIG. 1 is adapted to move slowly through the water by reason of its attachment to the vessel provided at the upper portion, and by means of the thrusters 22 provided at the lower end of the array 16a all as described above. The submersible means 20 of FIG. 2 further includes a fathometer 26 for detecting the depth under the submersible means 20. Signals from several spaced depth detecting devices 28 can be read remotely from onboard the vessel 10 to determine the orientation of this submersible means 20 so as to control its orientation remotely by the cable 18 and umbilical cord 12. In the preferred embodiment, the submersible means 20 is provided with a compass 31 to determine orientation of means 20.

In operation and when towed at relatively low speeds in shallow water, the sensor array 16a provides a 360° coverage pattern for detecting signals emitted from the lower portion of the submersible means 20 in a general radial direction and reflected back to the sensor array 16a from whatever condition or object is detected either in the water itself or at the bottom of the sea. Blocking of signals caused by seawater temperature variation is effectively avoided by the vertical extent of the array and the fact that many sensors are deployed over a wide vertical distance. This assures reception of passive or active reflected signals by at least some of the sensors with well known beamforming and signal processing techniques.

Different sensors can be used in the array to sense acoustic energy, electromagnetic energy, bioluminescence, biologics, and nuclear or other radiation. Radiation received can be either passive environmental radiation or active reflected radiation as emitted by transducers 30 in the forward portion of the submersible means 20. Such a system is well adapted for finding sunken metal objects, such as shipwrecks, bombs, torpedoes, or lost equipment including leaking radioactive pollution sources. The cylindrical array 16a preferably comprises 9, 111 foot individual cables attached to reels in the circular housing 14. Housing 14 and cables 16 permit deployment of the vertical array at depths greater than 20–30 fathoms. Thus, array 16a is preferably on the order of 111 feet in length so that when depths of greater than this dimension are to be investigated, the array 16a can be lowered to a depth that provides the desired coverage for the array. For shallower depths the array is only partially deployed and processed accordingly. The submersible means 20 is provided at a weight sufficient to assure that it achieves the necessary tension in the cables 16.

Figure 4:
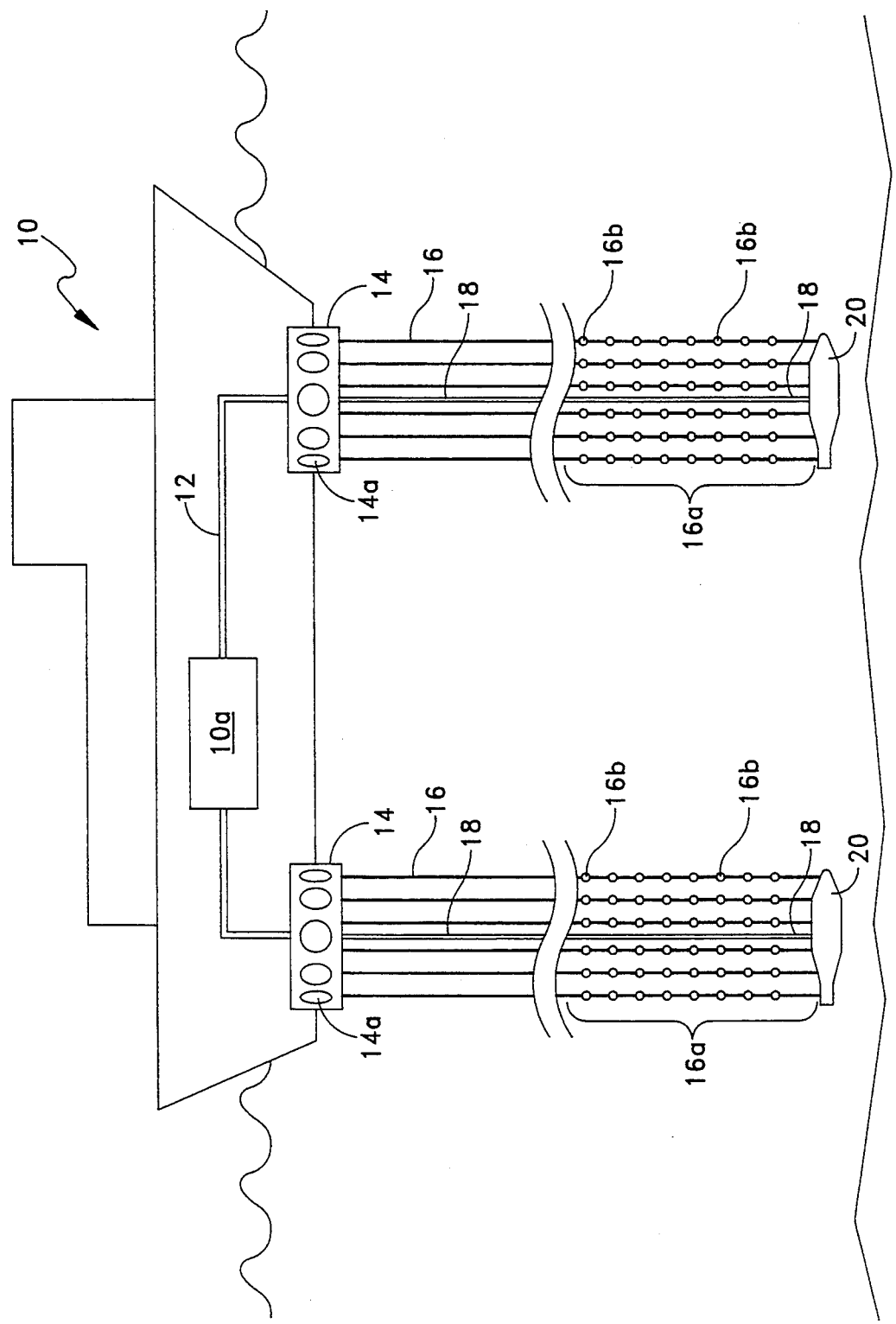
FIG. 4 shows an alternate embodiment of the submersible sensing system of FIG. 1 having two vertical arrays.

In the alternative embodiment of FIG. 4 this invention can provide two housings 14 joined to vessel 10 by umbilicals 12 and 12a. Each of these housings contains a plurality of cables 16 having an array 16a at the lower end thereof. Lower end of each array 16a is joined to a submersible means 20. The deployment of multiple arrays allows greater accuracy in determining the position of a radiation reflection source.

What is claimed is:

1. A submersible sensor for a vessel with sensor processing and control equipment, said system comprising:

housing means deployed from the vessel in communication wit the sensor processing and control equipment onboard the vessel;

a sensor array arranged in a geometric shape such that the axis of this geometric shape is oriented generally vertically, said array including a plurality of cables suspended from said housing, and said sensors arranged on said cables, said array communicating with said sensor processing equipment;

reel means in said housing for raising said cables to store said cables and their sensors inside said housing; and submersible means joined to the lower ends of said cables for maintaining said sensor array in said generally vertical geometric shape.

2. The combination according to claim 1 further comprising at least one transducer located in said submersible means and oriented to radiate energy radially outwardly relative said vertically oriented geometric array whereby a portion of the energy emitted from said transducers is reflected back to said sensors.

3. The combination according to claim 1 further comprising a propulsive means disposed on said submersible means, and joined to said control equipment on said vessel including control means to drive said submersible means in at least one direction to track the direction of the vessel.

4. The combination according to claim 3 wherein said propulsive means comprises at least one electric motor and a propeller coupled to said electric motor.

5. The combination according to claim 4 further characterized by depth detecting means onboard said submersible means, and said depth detecting means generating signals responsive to the depth of said submersible means said depth detecting means being in communication within said control equipment on said vessel.

6. The combination according to claim 5 wherein said depth detecting means includes individual detectors so arranged on said submersible means as to provide remote readout of the orientation of said submersible means.

7. The combination according to claim 6 further comprising:

at least one moveable control surface on said submersible means; and an actuator joined to said control surface and responsive to control signals from said vessel for moving said movable control surface.

8. The combination according to claim 2 wherein said geometric array of sensors comprises a plurality of circumaxially spaced cables with sensors arrayed on each cable to provide a generally cylindrical surface with the sensors provided thereon.

9. The combination of claim 7 further comprising a compass disposed on said submersible means to monitor the azimuth of said submersible means, and said compass having an output for transmission to said control equipment aboard said vessel.

10. The combination of claim 2 wherein said at least one transducer transmits acoustic energy, and said plurality of sensors are hydrophones.

11. The combination of claim 1 wherein said system comprises multiple housing means with reel means in each said housing, multiple sensor arrays with each said sensor array suspended from one said housing, and multiple submersible means with each said submersible means joined to the lower ends of one said array.

* * * * *